(12) United States Patent
Imai

(10) Patent No.: US 10,863,082 B2
(45) Date of Patent: Dec. 8, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Ayato Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/431,314

(22) Filed: Jun. 4, 2019

(65) Prior Publication Data

US 2020/0007754 A1 Jan. 2, 2020

(30) Foreign Application Priority Data

Jun. 28, 2018 (JP) ................................. 2018-122945

(51) Int. Cl.
| | |
|---|---|
| *G01N 21/17* | (2006.01) |
| *H04N 5/232* | (2006.01) |
| *G02B 5/20* | (2006.01) |
| *H04N 13/117* | (2018.01) |
| *G02B 5/30* | (2006.01) |

(52) U.S. Cl.
CPC ........... *H04N 5/23229* (2013.01); *G02B 5/20* (2013.01); *G02B 5/3025* (2013.01); *H04N 13/117* (2018.05)

(58) Field of Classification Search
None
See application file for complete search history.

(56) References Cited

U.S. PATENT DOCUMENTS 5,091,647 A * 2/1992 Carduner ........... G01B 11/0625
250/339.09
2016/0371880 A1 * 12/2016 Ide ......................... G06F 30/15

FOREIGN PATENT DOCUMENTS

JP 2016-133396 A 7/2016

* cited by examiner

*Primary Examiner* — Christopher G Findley
(74) *Attorney, Agent, or Firm* — Canon U.S.A., Inc. IP Division

(57) ABSTRACT

An image processing apparatus is capable of determining a height of a surface of an object having a structure including a high light transmittance layer located on a color development layer. The image processing apparatus includes an acquisition unit configured to acquire a plurality of pieces of image data and parameters associated with imaging, a generation unit configured to generate specular reflection data and a diffuse reflection data based on the plurality of pieces of image data, a first determination unit configured to determine a height of the color development layer based on the diffuse reflection data, and a second determination unit configured to determine a height of the high light transmittance layer based on the parameters, the specular reflection data, and the height of the color development layer.

19 Claims, 5 Drawing Sheets

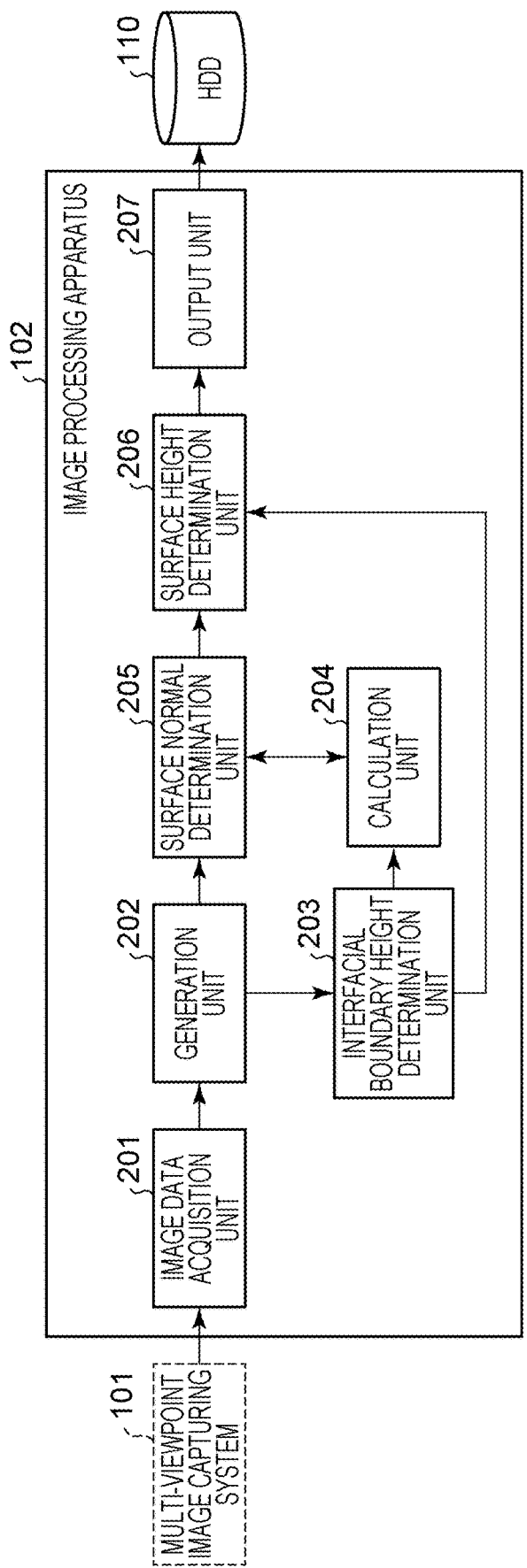

FIG. 3A
FIG. 3B
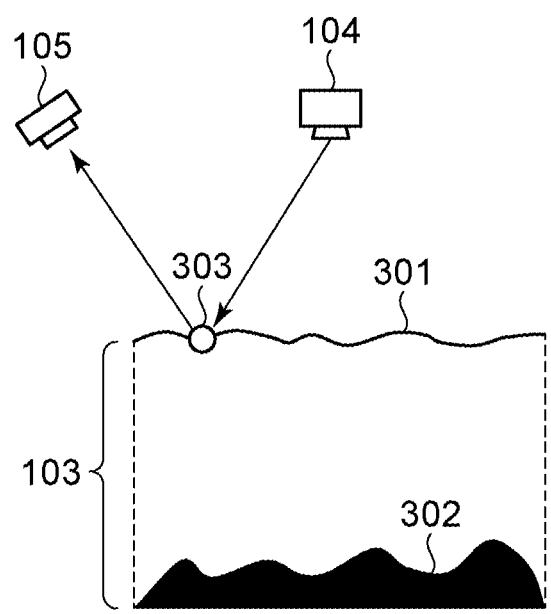
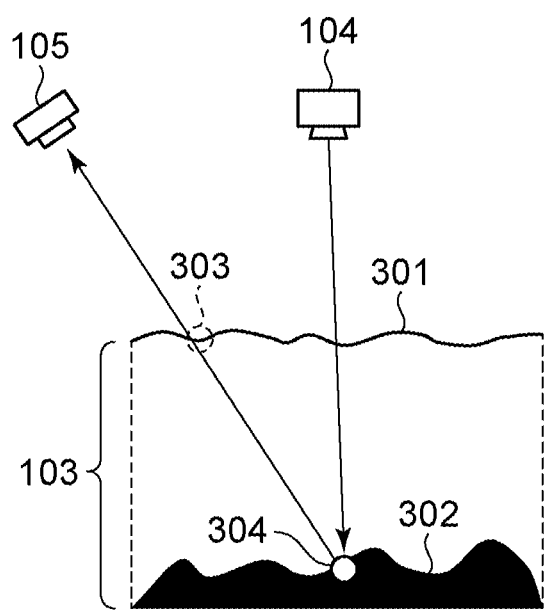

IMAGE PROCESSING APPARATUS, IMAGE PROCESSING METHOD, AND STORAGE MEDIUM

BACKGROUND

Field of the Disclosure

The present disclosure relates to an image processing technique for acquiring a shape of an object.

Description of the Related Art

In recent years, there has been an attempt to acquire a shape of an object based on an image of the object obtained by imaging the object. Japanese Patent Laid-Open No. 2016-133396 discloses a technique in which a selection is made for each region of an object as to whether an estimation of a normal distribution of the object using a photometric stereo method is to be performed or an estimation of a normal distribution using light polarization information is performed.

In some case, an object whose shape is to be acquired has a structure including a high light transmittance layer located on a color development layer. In such a case, a shape acquisition method using diffuse reflection light such as the photometric stereo method disclosed in Japanese Patent Laid-Open No. 2016-133396 is difficult to acquire a height of a surface of the high light transmittance layer.

SUMMARY

In view of the above, the present disclosure provides a technique of image processing for acquiring a height of a surface of an object having a structure including a high light transmittance layer located on a color development layer.

In an aspect, the present disclosure provides an image processing apparatus configured to determine a height of a surface of an object having a structure including a high light transmittance layer located on a color development layer, the image processing apparatus including an acquisition unit configured to acquire a plurality of pieces of image data obtained by capturing images of the object illuminated with light emitted from a light source in a plurality of geometric conditions, and also acquire parameters for determining the respective geometric conditions, a generation unit configured to generate, based on the plurality of pieces of image data, specular reflection data representing a reflection characteristic of light which is part of light emitted from the light source and specularly reflected as specular reflection light from the object and to generate diffuse reflection data representing a reflection characteristic of light which is part of the light emitted from the light source and diffuse-reflected as diffuse reflection light from the object, a first determination unit configured to determine a height of the color development layer based on the diffuse reflection data, and a second determination unit configured to determine a height of the high light transmittance layer based on the parameters, the specular reflection data, and the height of the color development layer.

Further features of the present disclosure will become apparent from the following description of exemplary embodiments with reference to the attached drawings.

BRIEF DESCRIPTION OF THE DRAWINGS

FIG. 2 is a diagram illustrating an example of a logical configuration of an image processing apparatus.

FIGS. 3A and 3B are diagrams illustrating a manner of capturing an image in a case where a polarizing filter is used.

DESCRIPTION OF THE EMBODIMENTS

Embodiments of the present disclosure are described in detail with reference to drawings. Note that the scope of the present disclosure is not limited by the embodiments described below, and a combination of all features described in the embodiments does not necessarily need to implement the present disclosure.

First Embodiment

Configuration of Shape Acquisition System

Figure 1:
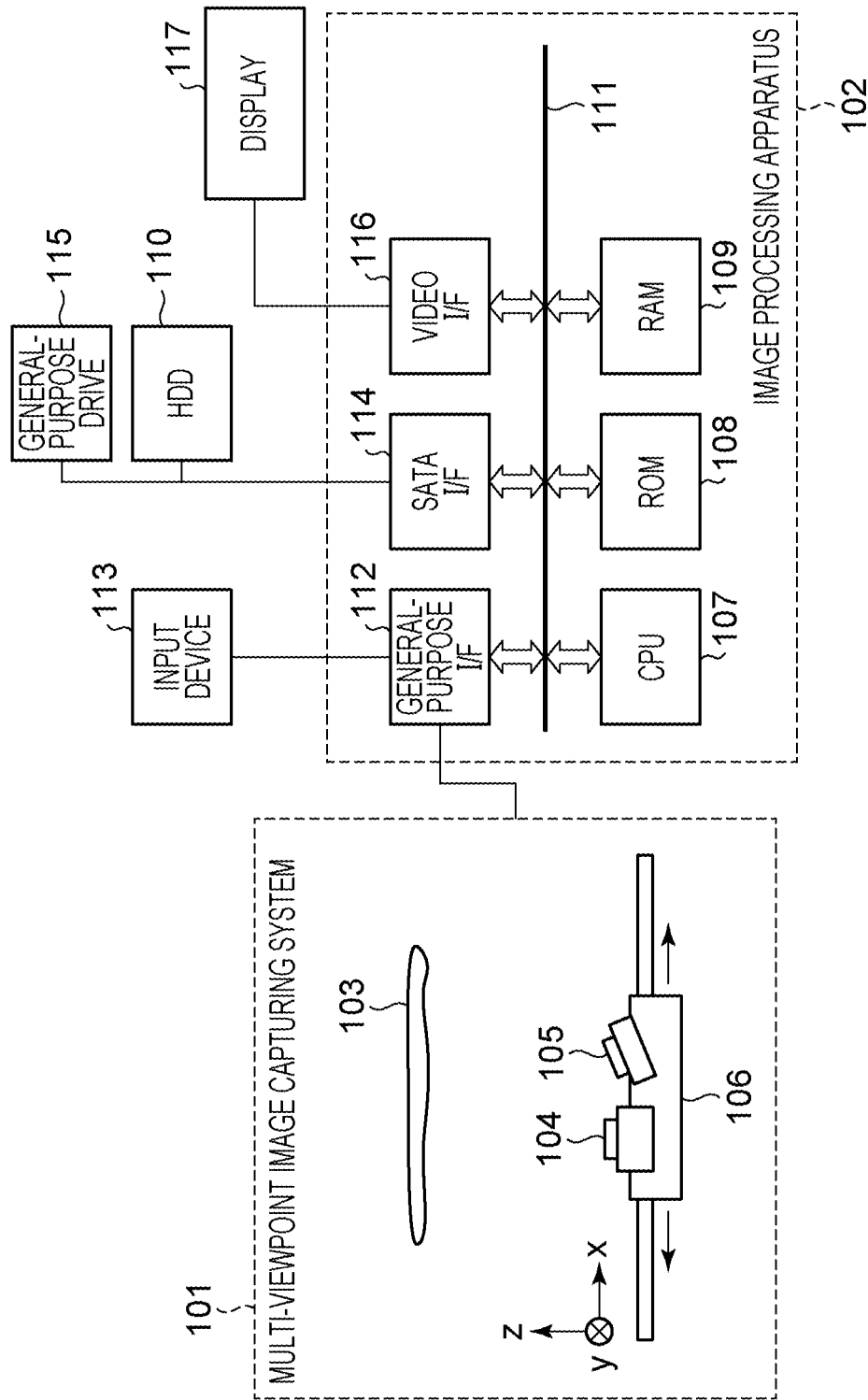
FIG. 1 is a diagram illustrating an example of a configuration of a shape acquisition system.

FIG. 1 is a diagram illustrating an example of a shape acquisition system according to a first embodiment. The shape acquisition system includes a multi-viewpoint image capturing system 101 and an image processing apparatus 102. The multi-viewpoint image capturing system 101 includes a light source 104, an image capturing apparatus 105, and a movable stage 106. The light source 104 according to the present embodiment is a projector. The image capturing apparatus 105 according to the present embodiment is a color digital camera. The image capturing apparatus 105 captures an image of an object 103 illuminated with light emitted from the light source 104 multiple times while changing an image-capturing position by moving the movable stage 106. As a result of capturing the image multiple times, a plurality of pieces of image data are obtained. The image capturing apparatus 105 generates each piece of image data such that each pixel of the image data has three channels respectively corresponding to R, G, and B. In the present embodiment, R values, G values, and B values each represented by 16 bits are recorded, as pixel values of image data, in the respective channels. However, the number of bits representing each pixel value is not limited 16, and each pixel value may be represented by 8 bits or the like. The light source 104 and the image capturing apparatus 105 are each provided with a movable polarizing filter, thereby making it possible to switch between a mode in which image capturing is performed by sensing light including diffuse reflection light and specular reflection light from the object 103 and a mode in which image capturing is performed by sensing only diffuse reflection light.

The object 103 is an object having a stricture including a high light transmittance layer (hereinafter also referred to as a transparent layer) located on a color development layer. In the present embodiment, the object 103 is an oil painting with a plane-like shape. The color development layer is a layer formed using a color material, and the transparent layer is a layer formed using a varnish (a transparent recording material). The movable stage 106 is a stage movable in an XY-plane in a three-dimensional space defined by an X-axis, a Y-axis, and a Z-axis shown in FIG. 1, The light source 104 and the image capturing apparatus 105 are fixed to the movable stage 106 such that they move, while maintaining relative positions among them, in a plane substantially parallel to the object 103. The object 103 is located approximately parallel to the XY-plane such that a surface to be measured faces the movable stage 106. The light source 104 is installed in a direction directly facing the object 103. The image capturing apparatus 105 is installed in a direction slightly tilted to the light source 104 so as to be able to capture an image of an area, illuminated with light emitted from the light source 104, of the object 103.

Note that the shape of the object 103 and the configuration of the multi-viewpoint image capturing system 101 are not limited to those described above in the example. It is allowed for the object 103 to have a shape other than a plane. For example, the object 103 may have a three-dimensional shape such as a sphere. In this case, to capture an image of a whole surface of the object 103, a robot arm capable of moving in any direction in a three-dimensional space may be used instead of the movable stage 106. Alternatively, the image capturing apparatus 105 may be maintained at a fixed position, and the object 103 may be put on a rotational table and may be rotated to capture an image of the whole surface of the object 103. Furthermore, the image capturing apparatus 105 and the object 103 both may be movable. Alternatively, a plurality of light sources and/or a plurality of image capturing apparatuses may be used thereby capturing an image a plurality of times in different geometric conditions. As long as an image can be captured in an illumination condition in which the light source 104 can be approximated as a single point light source, the light source 104 is not limited to a projector, but other point light sources such as an LED may be used.

The image processing apparatus 102 is, for example, a computer, and includes a CPU 107, a ROM 108, and a RAM 109. The CPU 107 uses the RAM 109 as a work memory and executes an OS (operating system) and various programs stored in the ROM 108, an HIM (hard disk drive) 110, or the like. The CPU 107 controls various units or elements via a system bus 111. Note that a process illustrated in a flow chart shown later is executed such that a program code stored in the ROM 108, the HDD 110, or the like is loaded in the RAM 109 and executed by the CPU 107. A general-purpose I/F (interface) 112 is connected, via a serial bus, to an input device 113 such as a mouse and/or a keyboard and the multi-viewpoint image capturing system 101. The image processing apparatus 102 is connected, via a serial bus, to the light source 104, the image capturing apparatus 105, and the movable stage 106, and thus it is possible to control an illumination condition, an image capturing operation, a viewpoint position, and/or the like. An SATA (serial ATA) I/F 114 is connected, via a serial bus, to the HDD 110 and the general-purpose drive 115 for reading/writing from/to various kinds of recording media. The CPU 107 uses the HDD 110 and/or various kinds of recording media mounted on the general-purpose drive 115 as a storage for various kinds of data. A video I/F 116 is connected to a display 117. The CPU 107 displays a UI (user interface) provided by a program on the display 117, and receives and accepts an instruction input by a user via the input device 113.

Logical Configuration of Image Processing Apparatus 102

A logical configuration of the image processing apparatus 102 is described below. Processes performed by respective units are executed by software such that a computer program is loaded from the ROM 108 or the like to the RAM 109 and executed by the CPU 107, FIG. 2 is a block diagram illustrating the logical configuration of the image processing apparatus 102. The image processing apparatus 102 includes an image data acquisition unit 201, a generation unit 202, an interfacial boundary height determination unit 203, a calculation unit 204, a surface normal determination unit 205, a surface height determination unit 206, and an output unit 207.

The image data acquisition unit 201 acquires a plurality of pieces of image data generated, in an image capturing operation, by the image capturing apparatus 105 and imaging parameters employed in obtaining the respective pieces of image data corresponding to respective image capturing operations. The imaging parameters include those in terms of a position and a direction of the light source 104, a position and a direction of the image capturing apparatus 105, internal parameters of the image capturing apparatus 105 in image capturing operations, and states of the polarizing filters. The internal parameters include those in terms of a focal length and a principal point position of a lens of the image capturing apparatus 105 and an image distortion parameter caused by the lens or the like. In the present embodiment, the image data acquisition unit 201 captures an image while driving various units of the multi-viewpoint image capturing system 101 thereby acquiring image data. Note that the image data acquisition unit 201 may acquire image data and imaging parameters stored in advance in the HDD 110 or the like.

A method of generating a plurality of pieces of image data by capturing images using the multi-viewpoint image capturing system 101 is described below. First, the light source 104 and the image capturing apparatus 105 are placed at predetermined positions and in directions with respect to the object 103. A linear polarizing filter A is placed in front of the light source 104 such that a polarization direction is perpendicular to a plane (hereinafter referred to as an incidence plane) in which incident light travels from the light source 104 to the object 103 and reflection light of the incident light travels. More specifically, in the present embodiment, the light source 104 and the image capturing apparatus 105 are placed in the same XZ-plane (incidence plane), while the linear polarizing filter A is placed such that light polarized in a Y-axis direction is allowed to pass. Polarized light (p-polarized light) oscillating only in a direction parallel to an incidence plane generally has a characteristic that the reflectance approaches 0 as the incidence angle of light approaches a particular value. In view of the above, in the present of embodiment, polarized light (s-polarized light) oscillating only in a direction perpendicular to the incidence plane is used. Furthermore, a linear polarizing filter B is placed in front of the image capturing apparatus 105, and image capturing is performed in the following two states: a state in which the polarization direction of the linear polarizing filter B is parallel to the polarization direction of the linear polarizing filter A; and a state in which the polarization direction of the linear polarizing filter B is perpendicular to the polarization direction of the linear polarizing filter A. Let a parallel polarization denote the state in which the polarization direction of the linear polarizing filter B is parallel to the polarization direction of the linear polarizing filter A, and let parallel polarization image data denote image data obtained by capturing an image in the parallel polarization state. Let a cross polarization denote the state in which the polarization direction of the linear polarizing filter B is perpendicular to the polarization direction of the linear polarizing filter A, and let cross polarization image data image data obtained by capturing an image in the cross polarization state. Thus, it is possible to generate parallel polarization image data and cross polarization image data in a particular geometric condition determined by the position and the direction of the light source 104 and the position and the direction of the image capturing apparatus 105. The multi-viewpoint image capturing system 101 performs an image capturing operation a plurality of times while moving the movable stage 106 thereby changing the geometric condition at each position of the object 103. This makes it possible to generate parallel polarization image data and cross polarization image data in each geometric condition. The image data acquisition unit 201 acquires parallel polarization image data and cross polarization image data in a plurality of geometric conditions.

Next, a manner in which an image is captured using a polarizing filter is described below with reference to FIGS. 3A and 3B. FIGS. 3A and 3B are diagrams schematically illustrating a manner in which diffuse reflection light and specular reflection light are reflected from the object 103 having a transparent layer at a surface. A surface 301 denotes a surface of the transparent layer, and an interfacial boundary 302 denotes an interfacial boundary between the transparent layer and a color development layer.

FIG. 3A illustrates a manner in which specular reflection light is incident on a certain pixel of the image capturing apparatus 105. Light emitted from the light source 104 is specularly reflected at a reflection point 303 on the surface of the transparent layer while maintaining its linear polarization and travels to the image capturing apparatus 105. When the luminance of the specular reflection light is denoted by $i_s$, and the transmittance of the linear polarizing filter B is denoted by t, the specular reflection light behaves in the parallel polarization state such that the specular reflection light passes through the linear polarizing filter B and is incident, with a luminance $tI_s$, on a particular pixel of the image capturing apparatus 105. On the other hand, in the cross polarization condition, specular reflection light is blocked, and thus the luminance becomes equal to 0.

FIG. 3B illustrates a manner in which diffuse reflection light is incident on the same pixel, as that in the case shown in FIG. 3A, of the image capturing apparatus 105. That is, light emitted from the light source 104 is diffuse-reflected by a part in the color development layer near a reflection point 304 which is located on an extension of a line segment connecting the image capturing apparatus 105 and the reflection point 303 and which is located at an interfacial boundary between the transparent layer and the color development layer. The diffuse reflection light, which is not polarized light, travels in a direction toward the image capturing apparatus 105. Because the diffuse reflection light is not polarized light, one-half of the diffuse reflection light is blocked by the linear polarizing filter B regardless of the polarization direction of the linear polarizing filter B, and the remaining part of the diffuse reflection light with a luminance $tI_d/2$ is incident on the pixel of the image capturing apparatus 105.

Let $I_p$ denote a luminance value (a pixel value) of each pixel of a parallel polarization image represented by parallel polarization image data in each channel, and Let $I_c$ denote a luminance value (a pixel value) of each pixel of a cross polarization image represented by cross polarization image data in each channel. When the luminance of the diffuse reflection light is $I_d$, the luminance of the specular reflection light is $I_s$, and the transmittance of the linear polarizing filter B is t, equation (1) and equation (2) shown below hold.

$$I_c = tI_d/2 \quad (1)$$

$$I_p = tI_d/2 + tI_s \quad (2)$$

The generation unit 202 generates specular reflection image data and diffuse reflection image data in each geometric condition based on image data acquired by the image data acquisition unit 201. The pixel value of the specular reflection image represented by the specular reflection image data is given by the luminance of the specular reflection light calculated according to equation (1) and equation (2). The pixel value of the diffuse reflection image represented by the diffuse reflection image data is given by the luminance of the diffuse reflection light calculated according to equation (1) and equation (2). The present embodiment uses an amount of a relative change in luminance between specular reflection light and diffuse reflection light that occurs depending on a change in geometric condition, and thus an influence of the transmittance t of the linear polarizing filter B can be neglected. Therefore, the generation unit 202 calculates a relative luminance $P_s$ of the specular reflection light and a relative luminance $I'_d$ of the diffuse reflection light according to equation (3) and equation (4) for each pixel of the parallel polarization image and the cross polarization image for each channel.

$$I'_d = tI_d = 2I_c \quad (3)$$

$$I'_s = tI_s = I_p - I_c \quad (4)$$

The generation unit 202 generates specular reflection image data by employing the relative luminance $I'_s$ of the specular reflection light as the pixel value of the specular reflection image, and generates diffuse reflection image data by employing the relative luminance $I'_d$ of the diffuse reflection light as the pixel value of the diffuse reflection image.

The interfacial boundary height determination unit 203 determines the height of the interfacial boundary between the transparent layer and the color development layer of the object 103 based on the diffuse reflection image data in each geometric condition using a known multi view stereo method. In the multi-view stereo method in the present embodiment, group-of-points data representing a shape of the object 103 is generated by block matching between viewpoints based on color information of the diffuse reflection light from the object 103. A group of points of the generated group-of-points data is approximated to a plane and generates interfacial boundary height data representing a height distribution of the approximated plane with a particular resolution.

Figure 4:
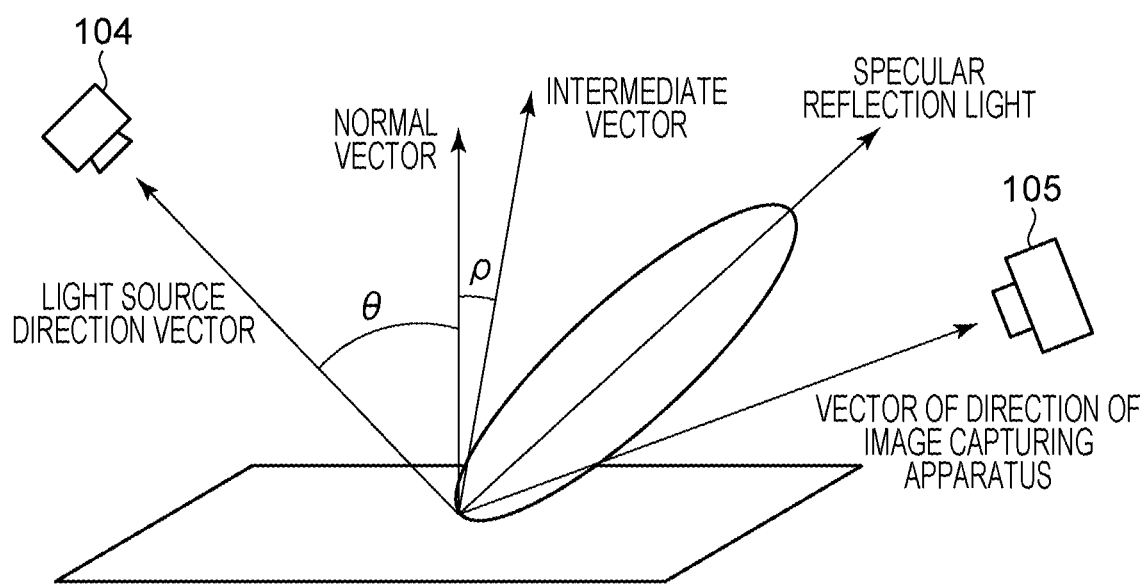
FIG. 4 is a diagram illustrating a geometric condition in which light is emitted for illumination and received.

The calculation unit 204 calculates a vector representing a direction from the reflection point to the light source 104 and a vector representing a direction from the reflection point to the image capturing apparatus 105 based on the imaging parameters and coordinates of the reflection point of the specular reflection light in the object 103 for each pixel of the specular reflection image in each geometric condition. Furthermore, the calculation unit 204 calculates an intermediate vector representing an intermediate direction between the light source direction vector representing the direction from the reflection point to the light source 104 and the vector of a direction of an image capturing apparatus representing the direction from the reflection point to the image capturing apparatus 105. Furthermore, the calculation unit 204 calculates an angle θ made between the normal vector and the light source direction vector and an angle ρ made between the normal vector and the intermediate vector based on the coordinates of the reflection point and the normal vector representing the direction of the normal to the surface of the object 103, FIG. 4 is a diagram illustrating relationships among the light source direction vector at the reflection point located on the object 103, the vector of a direction of an image capturing apparatus, the normal vector, the intermediate vector, the angle θ, and the angle ρ.

The surface normal determination unit 205 determines the normal direction at the reflection point on the object 103 and a reflection characteristic (BRDF) based on the specular reflection image data in each geometric condition. More specifically, in a graph in which a horizontal axis represents the angle ρ and a vertical axis represents the reflectance, a reflectance of specular reflection light associated with a pixel of interest in each geometric condition is plotted, and a group of plotted points is approximated by a Gaussian function thereby modeling the reflection characteristic. Note that it is assumed that the half width of the Gaussian function is equal for all channels of R, G, and B. The reflectance of the specular reflection light in each channel is calculated by dividing the luminance $I'_s$ of the specular reflection image by the luminance of light emitted from the light source 104 and reflected for each channel. The surface normal determination unit 205 employs, as parameters, a greatest reflectance and a half width of the Gaussian function of a pixel of interest of each channel, and optimizes the parameters so as to minimize an error between a reflectance of each specular reflection image and a reflectance calculated from the model. In the present embodiment, a known Newton's method is used in the optimization process. However, other methods such as a known Levenberg-Marquardt method may be employed.

The surface height determination unit 206 generates surface height data representing a height distribution of a transparent layer surface based on the interfacial boundary height data and surface normal data representing a normal distribution of the transparent layer determined via an optimization process performed by the surface normal determination unit 205. In a first-time execution of the optimization process, a height distribution represented by interfacial boundary height data is employed as an initial values, and the optimization process is performed using, as parameters, heights of respective pixels represented by the interfacial boundary height data so as to reduce an error between a normal distribution calculated by differentiating the interfacial boundary height distribution and a normal distribution of the transparent layer surface represented by the surface normal data. In the optimization process according to the present embodiment, a process of increasing or reducing a height of a pixel of interest and heights of neighboring pixels based on an error of a normal direction at each pixel is performed sequentially for all pixels, and this process is performed repeatedly until a change in the height distribution becomes small enough. Next, an equal value is added to a value of each pixel of the optimized interfacial boundary height data such that heights of a predetermined ratio of pixels in all pixels represented by the optimized interfacial boundary height data are greater than heights of corresponding pixels represented by the unoptimized interfacial boundary height data. The interfacial boundary height data obtained as a result of the addition process is employed as surface height data. This addition process is performed for excluding an outlier due to an error of the shape of the color development layer or an error of the normal distribution of the transparent layer. The predetermined ratio is set depending on the shape of the color development layer and/or the acquisition accuracy of the normal distribution of the transparent layer. The ratio may be set to a value close to 100%. Note that in the surface height data, as for a pixel having a height smaller than the interfacial boundary height distribution even after the equal value is added, the pixel value is overwritten with the value of the interfacial boundary height distribution. Via the process described above, it is possible to obtain surface height data such that the height is equal to or larger than the height of the interfacial boundary between the transparent layer and the color development layer and the surface height data has a desired normal distribution.

The output unit 207 converts the interfacial boundary height data generated by the interfacial boundary height determination unit 203 and the surface height data generated by the surface height determination unit 206 into a predetermined format and stores them in the HDD 110.

Process Performed by the Image Processing Apparatus 102

Figure 5:
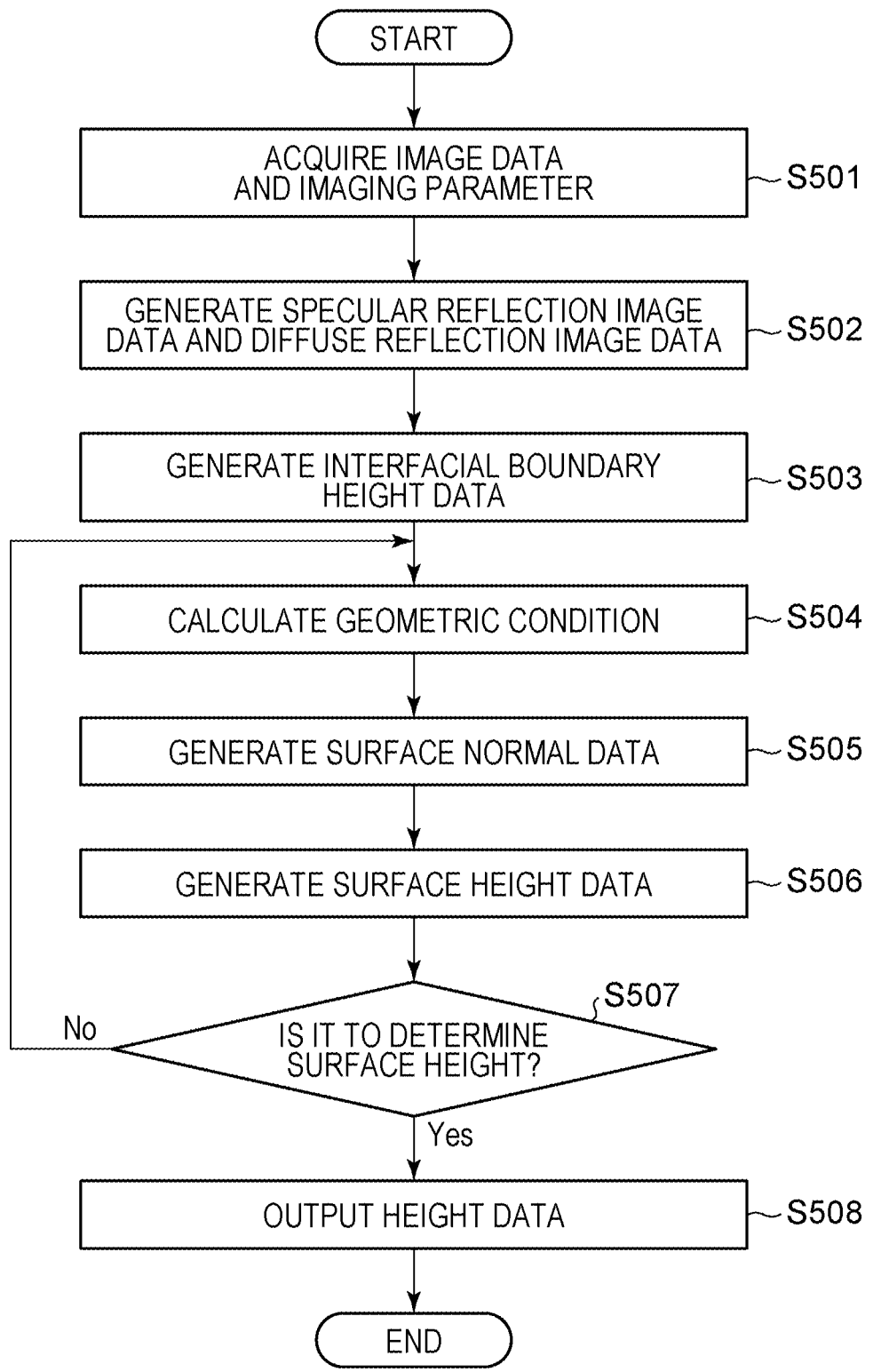
FIG. 5 is a flow chart illustrating a process performed by an image processing apparatus.

A process performed by the image processing apparatus 102 is described in detail below. FIG. 5 is a flow chart illustrating the process performed by the image processing apparatus 102. Hereinafter, each step is denoted by a step number following a prefix of S.

In S501, the image data acquisition unit 201 acquires a plurality of pieces of image data and imaging parameters used in respective image capturing operations to obtain respective pieces of image data. The plurality of pieces of image data acquired here are a plurality of pieces of parallel polarization image data and cross polarization image data respectively captured in a plurality of geometric conditions as described above. The number of geometric conditions is set to a value that is large enough to calculate the respective parameters in the optimization process described above.

In S502, the generation unit 202 generates specular reflection image data and diffuse reflection image data in each geometric condition based on the plurality of pieces of image data acquired in S501.

In S503, the interfacial boundary height determination unit 203 estimates a shape of the interfacial boundary between the transparent layer and the color development layer, and generates interfacial boundary height data representing a height distribution of the interfacial boundary between the transparent layer and the color development layer.

In S504, the calculation unit 204 calculates a light source direction vector, a vector of a direction of the image capturing apparatus, an intermediate vector, an angle θ, and an angle ρ based on coordinates of a reflection point of specular reflection light in the object 103 and the imaging parameters. Note that it is assumed that the thickness of the transparent layer of the object 103 is sufficiently small compared with the distance from the object 103 to the light source 104 or the image capturing apparatus 105, and in a first-time execution of the process of calculating the geometric condition, the height of the interfacial boundary between the transparent layer and the color development layer is used as an approximate value of the height of the transparent layer surface. That is, in the first-time execution of the process of S504, coordinates of the reflection point of the specular reflection light in the object 103 are given by coordinates of interfacial boundary height data. In second-time and following executions of the process, coordinates of the surface height data obtained in the previous execution of the process in S506 are employed. In the first-time execution of the process, as for the normal vector used in calculating the angle θ and the angle ρ, a normal vector obtained by differentiating the height distribution represented by the interfacial boundary height data is used. In the second-time and following executions of the process, a normal vector of surface normal data generated in the previous execution of S505 is used.

In S505, the surface normal determination unit 205 determines the normal direction at the reflection point on the object 103 and determines the reflection characteristic (BRDF) based on the specular reflection image data in each geometric condition. More specifically, the surface normal determination unit 205 calculates each parameter by performing the optimization process described above, and generates the surface normal data representing the normal distribution of the transparent layer and the reflection characteristic data representing the reflection characteristic of the transparent layer. Note that the reflection characteristic data is data representing the greatest reflectance and the half width of the Gaussian function determined in the optimization process for each pixel.

In S506, the surface height determination unit 206 generates the surface height data representing the height distribution of the transparent layer surface based on the interfacial boundary height data generated in S503 and the surface normal data generated in S505.

In S507, the surface height determination unit 206 calculates the difference between the height distribution represented by the surface height data generated in the last execution of S506 and the height distribution represented by the surface height data generated in the execution immediately previous to the last execution of S506, and the surface height determination unit 206 compares the difference with a threshold value. If the difference is smaller than or equal to the threshold value, the processing flow proceeds to S508. In a case where the difference is greater than the threshold value, the processing flow returns to S504. Note that in the first execution of the process in S507, the difference between the height distribution represented by the surface height data generated in S506 and the height distribution represented by the interfacial boundary height data is compared with the threshold value, and it is determined whether to continue the process from S504 to S506.

In S508, the output unit 207 converts the interfacial boundary height data generated in S503 and the surface height data generated in the last execution of S506 into a predetermined format and stores them in the HDD 110.

Advantageous Effects of the First Embodiment

As described above, the image processing apparatus according to the present embodiment is an apparatus configured to determine a height of a surface of an object having a structure including a high light transmittance layer located on a color development layer. In the present embodiment, the image processing apparatus acquires a plurality of pieces of image data obtained by capturing an image of the object illuminated with light emitted from a light source in a plurality of geometric conditions, and also acquires parameters for determining the respective geometric conditions. Based on the plurality of pieces of image data, the image processing apparatus generates specular reflection data representing a reflection characteristic of light which is part of light emitted from the light source and specularly reflected as specular reflection light from the object and diffuse reflection data representing a reflection characteristic of light which is part of the light emitted from the light source and diffuse-reflected as diffuse reflection light from the object. The image processing apparatus determines a height of the color development layer based on the diffuse reflection data. The image processing apparatus determines a height of the high light transmittance layer based on the parameters in terms of imaging, the specular reflection data, and the height of the color development layer. Thus, it is possible to acquire a height of a surface of an object having a structure including a high light transmittance layer located on a color development layer.

Modifications

In the embodiment described above, in the parallel polarization state, the polarization direction of the linear polarizing filter B is set to be parallel to the polarization direction of the linear polarizing filter A, while in the parallel polarization state, the polarization direction of the linear polarizing filter B is set to be perpendicular to the polarization direction of the linear polarizing filter A. However, the polarization directions do not need to be precisely parallel or perpendicular. As the polarization direction of the linear polarizing filter B approaches being parallel to the polarization direction of the linear polarizing filter A, the luminance of a captured image increases. On the other hand, as the polarization direction of the linear polarizing filter B approaches being perpendicular to the polarization direction of the linear polarizing filter A, the luminance of a captured image decreases. Using this characteristic, a large number of images may be captured while changing the polarization direction of the linear polarizing filter B, and an image having a highest luminance or having a highest average luminance or the like may be employed as a parallel polarization image and an image having a lowest luminance or having a lowest average luminance or the like may be employed as a cross polarization image. In an alternative example, a highest luminance and a lowest luminance may be acquired for each pixel from a plurality of images, thereby generating parallel polarization image data and cross polarization image data. In a case where there is a large difference in luminance between a parallel polarization image and a cross polarization image, saturation of a pixel value may be suppressed, for example, by setting exposure times to be different between the parallel polarization image and the cross polarization image, or other methods. In this case, the luminance of each image may be determined such that a value corresponding to an equal exposure time is calculated, for example, by dividing the pixel value by the exposure time, and the obtained value is employed as the luminance.

In the embodiment described above, light reflected from the object 103 is divided into specular reflection light and diffuse reflection light using polarizing filters. However, the method of dividing reflected light is not limited to the example described above. For example, taking into account a fact that diffuse reflection light has a constant reflectance regardless of an observation angler, the luminance of the diffuse reflection light may be given by a lowest luminance among pixel values of corresponding pixels of images represented by image data obtained by imaging the same part of the object 103 in respective geometric conditions. The luminance of the specular reflection light can be calculation by subtracting the luminance of the diffuse reflection light from the highest luminance of pixel values of corresponding pixels. Thus, it is possible to generate specular reflection image data and diffuse reflection image data without using polarizing filters. It may be regarded that a distribution of a reflectance in a geometric condition can be modelled by a Gaussian function (for mirror reflection) and a constant (for diffuse reflection), and optimization may be performed using the greatest reflectance and the half width of the Gaussian function, the constant, and the normal vector are parameters.

In the embodiment described above, the generation unit 202 calculates the luminance of specular reflection light as the pixel value of the specular reflection image and calculates the luminance of diffuse reflection light as the pixel value of the diffuse reflection image. However, the pixel value of each reflection image is not limit to the example described above as long as reflection characteristic of each piece of reflection light is represented. For example, instead of the luminance, a reflectance may be used as each pixel value. In this case, the reflectance is calculated by dividing the calculated luminance of each piece of reflection light by the luminance of light emitted from the source 104 for each channel.

In the embodiment described above, the interfacial boundary height determination unit 203 determines the height of the interfacial boundary between the transparent layer and the color development layer in the object 103 by using the known multi-view stereo method. However, the method of determining the height of the interfacial boundary is not limited to the example described above. For example, a known phase shift method or the like may be used. In this case, the interfacial boundary height determination unit 203 determines the height of the interfacial boundary based on image data obtained by capturing images of the object 104 illuminated with pattern light emitted from the light source 104.

In S503 according to the embodiment described above, the interfacial boundary height determination unit 203 generates only the interfacial boundary height data. However, in addition to the interfacial boundary height data, color image data including color information corresponding to the interfacial boundary height data may be generated. In this case, one of a plurality of pieces of diffuse reflection image data in a plurality of geometric conditions may be selected and employed as the color image data, or color image data may be generated such that each pixel value thereof is given by an average value of pixel values of diffuse reflection images represented by the respective pieces of the diffuse reflection image data. In determining the average value of pixel values, weighting may be performed.

In the embodiment described above, the surface height determination unit 206 generates the surface height data. However, the surface height determination unit 206 may generate data representing a thickness of the transparent layer. In this case, the thickness of the transparent layer is calculated by subtracting the height of the height distribution represented by the interfacial boundary height data from the height of the height distribution represented by the generated surface height data.

In the embodiment described above, the surface normal determination unit 205 performs the optimization process under the assumption that the half width of the Gaussian function is equal for all channels. However, in the optimization process, a half width of a Gaussian function may be employed as a parameter individually for each channel.

In S507 according to the embodiment described above, the surface height determination unit 206 determines whether the difference between the height distribution represented by the surface height data generated in the last execution and the height distribution represented by the surface height data generated in the execution immediately previous to the last execution is smaller than or equal to the threshold value. Alternatively, the surface height determination unit 206 may determine whether the process from S504 to S506 has been repeated a predetermined number of times. Note that the process from S504 to S506 may be performed only once without being repeated.

In the embodiment described above, the output unit 207 converts the interfacial boundary height data and the surface height data into a predetermined format and stores them in the HDD 110. The output unit 207 may further store color image data and/or reflection characteristic data in the HDD 110 in association with the interfacial boundary height data and the surface height data. Instead of outputting the interfacial boundary height data and the surface height data to a storage apparatus such as the HDD 110, the output unit 207 may output them to a printer, a display, or the like. In a case where the output destination is a printer, for example, the amount of a recording material for reproducing the height distribution represented by the height data is calculated based on the height data, and recording material amount data representing the amount of the recording material may be output. A half-tone process or a path decomposition process may be performed on the recording material amount data, and resultant data may be output.

In the embodiment described above, an equal value is added to a value of each pixel in the optimized interfacial boundary height data such that the thickness of the transparent layer has a positive value for the predetermined ratio of pixels. However, the method of generating the surface height data is not limited to the example described above. For example, an exposed area of the color development layer where there is no transparent layer is detected from the object 103, and addition/subtraction may be performed such that the thickness of the transparent layer nearly equals 0 in the detected area. The exposed-area detection may be accomplished, for example, by selectively detecting a transparent layer material and a color development layer material based on the generated reflection characteristic data or by detecting an area where a normal obtained by differentiating the height distribution represented by the interfacial boundary height data is coincident with a normal represented by the surface normal data. In the surface height data, a height value in the exposed area may be overwritten with a value of the interfacial boundary height distribution.

In the embodiment described above, the image capturing apparatus 105 is a color digital camera capable of generating color image data. However, a digital camera configured to generate grayscale image data may be employed. In this case, the processes described in the embodiment are performed not for three channels of R, G, and B but for one channel associated with the luminance.

As described above, the technique according to the present disclosure makes it possible to acquire a height of a surface of an object having a structure including a high light transmittance layer located on a color development layer.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Bin-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-122945 filed Jun. 28, 2018, which is hereby incorporated by reference herein in its entirety.

What is claimed is:

1. An image processing apparatus configured to determine a height of a surface of an object having a structure including a high light transmittance layer located on a color development layer, the image processing apparatus comprising:
   an acquisition unit configured to acquire a plurality of pieces of image data obtained by capturing images of the object illuminated with light emitted from a light source in a plurality of geometric conditions, and also acquire parameters for determining the respective geometric conditions;
   a generation unit configured to generate, based on the plurality of pieces of image data, specular reflection data representing a reflection characteristic of light which is part of light emitted from the light source and specularly reflected as specular reflection light from the object and to generate diffuse reflection data representing a reflection characteristic of light which is part of the light emitted from the light source and diffuse-reflected as diffuse reflection light from the object;
   a first determination unit configured to determine a height of the color development layer based on the diffuse reflection data; and
   a second determination unit configured to determine a height of the high light transmittance layer based on the parameters, the specular reflection data, and the height of the color development layer and to determine a thickness of the high light transmittance layer based on the height of the color development layer and the height of the high light transmittance layer.

2. The image processing apparatus according to claim 1, wherein the plurality of pieces of image data are image data obtained by performing image capturing multiple times in respective geometric conditions while changing a polarization direction using polarizing filters.

3. The image processing apparatus according to claim 2, wherein
   the polarizing filters are disposed respectively in front of an image capturing apparatus adapted to perform the image capturing and in front of the light source, and
   the image capturing by the image capturing apparatus is performed at least in a state in which polarization directions are parallel and in a state in which polarization directions are perpendicular.

4. The image processing apparatus according to claim 1, wherein the parameters include a position and a direction of the light source, and a position and a direction of the image capturing.

5. The image processing apparatus according to claim 1, wherein each of the geometric conditions is determined by a position and a direction of the light source, a position and a direction of the image capturing, and a position of the object.

6. The image processing apparatus according to claim 1, further comprising
   a calculation unit configured to calculate, based on the parameters and the height of the color development layer, a light source direction vector representing a direction to the light source from a reflection point, in the object, where light emitted from the light source is reflected, and a vector of a direction of an image capturing apparatus representing a direction of the image capturing, and
   a third determination unit configured to determine a normal distribution of a surface of the high light transmittance layer based on the light source direction vector, the vector of the direction of the image capturing apparatus, the height of the color development layer, and the specular reflection data,
   wherein the second determination unit determines the height of the high light transmittance layer based on the height of the color development layer and the normal distribution of a surface of the high light transmittance layer.

7. The image processing apparatus according to claim 6, wherein
   the specular reflection data is data representing a reflectance of the specular reflection light, and
   the third determination unit approximates the reflectance of the specular reflection light in each of the geometric conditions by a function based on the specular reflection data and performs an optimization process using at least a normal vector of a surface of the high light transmittance layer so as to reduce a difference between a value of the function obtained by the approximation and the reflectance represented by the specular reflection data.

8. The image processing apparatus according to claim 7, wherein the third determination unit performs the optimization process using the normal vector of a surface of the high light transmittance layer, a maximum reflectance of the function, and a half width of the function as parameters.

9. The image processing apparatus according to claim 8, wherein the third determination unit further generates reflection characteristic data representing the greatest reflectance of the function determined by the optimization process and the half width of the function.

10. The image processing apparatus according to claim 6, wherein the second determination unit performs an optimization process using the height of the high light transmittance layer as a parameter so as to reduce a difference between a normal distribution calculated based on a surface of the color development layer and a normal distribution of a surface of the high light transmittance layer.

11. The image processing apparatus according to claim 1, wherein the first determination unit determines the height of the color development layer based on the diffuse reflection data in the respective geometric conditions using a stereo method.

12. The image processing apparatus according to claim 1, wherein the first determination unit further determines a color of the color development layer based on the diffuse reflection data.

13. The image processing apparatus according to claim 1, further comprising an output unit configured to output first height data representing the height of the color development layer and second height data representing the height of the high light transmittance layer.

14. The image processing apparatus according to claim 1, wherein the object is an object having a shape similar to a plane formed such that the color development layer is formed using a color material, and the high light transmittance layer is formed using a transparent recording material.

15. The image processing apparatus according to claim 1, further comprising an output unit configured to generate, based on first height data representing the height of the color development layer and second height data representing the height of the high light transmittance layer, recording material amount data representing an amount of a recording material for reproducing, on a recording medium, a height distribution represented by each piece of height data and output the generated recording material amount data to a printer.

16. The image processing apparatus according to claim 1, wherein the generation unit determines pixel values of pixels of the diffuse reflection data such that a smallest pixel value among pixel values at each pixel location of images represented by the plurality of pieces of image data is employed as a pixel value of a corresponding pixel of the diffuse reflection data.

17. The image processing apparatus according to claim 16, wherein the generation unit determines pixel values of pixels of the specular reflection data such that a value obtained as a result of subtracting the smallest pixel value from a largest pixel value among pixel values at each pixel location of images represented by the plurality of pieces of image data is employed as a pixel value of a corresponding pixel of the specular reflection data.

18. An image processing method of determining a height of a surface of an object, the object having a structure including a high light transmittance layer located on a color development layer, the image processing method comprising:
  acquiring a plurality of pieces of image data obtained by capturing an image of the object illuminated with light emitted from a light source in a plurality of geometric conditions, and also acquiring parameters for determining the respective geometric conditions;
  performing a generation process of generating, based on the plurality of pieces of image data, specular reflection data representing a reflection characteristic of light which is part of light emitted from the light source and specularly reflected as specular reflection light from the object and generating diffuse reflection data representing a reflection characteristic of light which is part of the light emitted from the light source and diffuse-reflected as diffuse reflection light from the object;
  performing a first determination process of determining a height of the color development layer based on the diffuse reflection data;
  performing a second determination process of determining a height of the high light transmittance layer based on the parameters, the specular reflection data, and the height of the color development layer; and
  performing a third determination process of determining a thickness of the high light transmittance layer based on the height of the color development layer and the height of the high light transmittance layer.

19. A non-transitory computer-readable storage medium storing instructions that, when executed by a computer, cause the computer to perform an image processing method of determining a height of a surface of an object having a structure including a high light transmittance layer located on color development layer, the image processing method comprising:
  acquiring a plurality of pieces of image data obtained by capturing an image of the object illuminated with light emitted from a light source in a plurality of geometric conditions, and also acquiring parameters for determining the respective geometric conditions;
  performing a generation process of generating, based on the plurality of pieces of image data, specular reflection data representing a reflection characteristic of light which is part of light emitted from the light source and specularly reflected as specular reflection light from the object and diffuse reflection data representing a reflection characteristic of light which is part of the light emitted from the light source and diffuse-reflected as diffuse reflection light from the object;
  performing a first determination process of determining a height of the color development layer based on the diffuse reflection data;
  performing a second determination process of determining a height of the high light transmittance layer based on the parameters, the specular reflection data, and the height of the color development layer; and
  performing a third determination process of determining a thickness of the high light transmittance layer based on the height of the color development layer and the height of the high light transmittance layer.

* * * * *